US012008765B2

United States Patent
Watanabe et al.

(10) Patent No.: US 12,008,765 B2
(45) Date of Patent: Jun. 11, 2024

(54) CANDIDATE REGION ESTIMATION DEVICE, CANDIDATE REGION ESTIMATION METHOD, AND PROGRAM

(71) Applicant: NIPPON TELEGRAPH AND TELEPHONE CORPORATION, Tokyo (JP)

(72) Inventors: Yukito Watanabe, Tokyo (JP); Shuhei Tarashima, Tokyo (JP); Takashi Hosono, Tokyo (JP); Jun Shimamura, Tokyo (JP); Tetsuya Kinebuchi, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 676 days.

(21) Appl. No.: 17/265,166

(22) PCT Filed: Aug. 1, 2019

(86) PCT No.: PCT/JP2019/030292
§ 371 (c)(1),
(2) Date: Feb. 1, 2021

(87) PCT Pub. No.: WO2020/027282
PCT Pub. Date: Feb. 6, 2020

(65) Prior Publication Data
US 2021/0304415 A1    Sep. 30, 2021

(30) Foreign Application Priority Data

Aug. 2, 2018 (JP) ................................. 2018-145608

(51) Int. Cl.
*G06T 7/12* (2017.01)
*G06T 7/11* (2017.01)
*G06T 7/136* (2017.01)

(52) U.S. Cl.
CPC ................ *G06T 7/12* (2017.01); *G06T 7/11* (2017.01); *G06T 7/136* (2017.01)

(58) Field of Classification Search
CPC .............. G06T 7/11; G06T 7/12; G06T 7/136
See application file for complete search history.

(56) References Cited

U.S. PATENT DOCUMENTS 5,268,967 A * 12/1993 Jang .................... G06T 7/187
382/132
5,680,471 A * 10/1997 Kanebako ............. G06T 7/0012
600/407

(Continued)

FOREIGN PATENT DOCUMENTS

| JP | 2000032287 A | * | 1/2000 |
| JP | 2015103075 A | | 6/2015 |

OTHER PUBLICATIONS

Demigny et al. ("An Effective Resolution Definition or How to Choose an Edge Detector, Its Scale Parameter and the Threshold?", Proceedings of 3rd IEEE International Conference on Image Processing; Date of Conference: Sep. 19-19, 1996) (Year: 1996).*

(Continued)

*Primary Examiner* — Manav Seth

(57) ABSTRACT

The present invention makes it possible to estimate, with high precision, a candidate region indicating each of multiple target objects included in an image. A parameter determination unit 11 determines parameters to be used when detecting a boundary line of an image 101 based on a ratio between a density of boundary lines included in an image 101 and a density of boundary lines in a region indicated by region information 102 indicating the region including at least one of the multiple target objects included in the image 101. A boundary line detection unit 12 detects the boundary line in the image 101 using the parameter. For each of the multiple target objects included in the image 101, (Continued)

the region estimation unit 13 estimates the candidate region of the target object based on the detected boundary line.

20 Claims, 3 Drawing Sheets

(56) References Cited

U.S. PATENT DOCUMENTS

| | | | | |
|---|---|---|---|---|
| 7,596,273 | B2* | 9/2009 | Aoyama | G06T 7/12 |
| | | | | 382/199 |
| 9,070,023 | B2* | 6/2015 | Du | G06V 40/103 |
| 10,313,637 | B2* | 6/2019 | Matsunobu | G02B 7/34 |
| 2001/0020949 | A1* | 9/2001 | Gong | H04N 1/40062 |
| | | | | 345/593 |
| 2007/0237241 | A1* | 10/2007 | Ha | H04N 19/117 |
| | | | | 375/E7.226 |
| 2008/0181496 | A1* | 7/2008 | Ferman | G06V 30/18105 |
| | | | | 382/168 |
| 2009/0041344 | A1* | 2/2009 | Campbell | G06V 10/56 |
| | | | | 382/164 |
| 2013/0163869 | A1* | 6/2013 | Chang | G06V 10/44 |
| | | | | 382/199 |
| 2013/0259383 | A1* | 10/2013 | Kondo | G06V 30/148 |
| | | | | 382/199 |
| 2014/0294303 | A1* | 10/2014 | Kawatani | G06T 7/12 |
| | | | | 382/180 |

OTHER PUBLICATIONS

Lunscher et al. ("Optimal Edge Detector Design I: Parameter Selection and Noise Effects," IEEE Transactions on Pattern Analysis and Machine Intelligence ( vol. PAMI-8, Issue: 2, Mar. 1986) (Year: 1986).*

Xia et al. ("Automatic parameters selection method of edge detector in the unstructured environment," IEEE International Conference on Robotics and Biomimetics; Date of Conference: Feb. 22-25, 2009) (Year: 2009).*

Henstock et al. ("Automatic gradient threshold determination for edge detection," IEEE Transactions on Image Processing ( vol. 5, Issue: 5, May 1996)) (Year: 1996).*

Hwang et al. ("A spatio-temporal generalization of Canny's edge detector," Proceedings 10th International Conference on Pattern Recognition; Date of Conference: Jun. 16-21, 1990) (Year: 1990).*

Bennamoun et al. ("," IEEE International Conference on Systems, Man and Cybernetics. Intelligent Systems for the 21st Century; Date of Conference: Oct. 22-25, 1995) (Year: 1996).*

Zitnick et al. (2014) "Edge boxes: Locating object proposals from edges," ECCV, 15 pages.

John Canny (1986) "John Canny A Computational Approach to Edge Detection," IEEE Trans. on PAML 8(6): pp. 679-698.

Fang et al. (2009) "The Study on An Application of Otsu Method in Canny Operator," Proceedings of the 2009 International Symposium on Information Processing (ISIP'09), Huangshan, P. R. China, Aug. 21-23, 2009, pp. 109-112.

* cited by examiner

CANDIDATE REGION ESTIMATION DEVICE, CANDIDATE REGION ESTIMATION METHOD, AND PROGRAM

CROSS-REFERENCE TO RELATED APPLICATIONS

This application is a U.S. 371 Application of International Patent Application No. PCT/JP2019/030292, filed on 1 Aug. 2019, which application claims priority to and the benefit of JP Application No. 2018-145608, filed on 2 Aug. 2018, the disclosures of which are hereby incorporated herein by reference in their entireties.

TECHNICAL FIELD

The present invention relates to a candidate region estimation apparatus, a candidate region estimation method, and a program, and in particular relates to a candidate region estimation apparatus, a candidate region estimation method, and a program for estimating a candidate region indicating multiple target objects.

BACKGROUND ART

Conventionally, object candidate region estimation for estimating a candidate region in which a single object in an image is expected to be included has been widely used as pre-processing for object searching for searching for an object included in an image, and object detection, and object candidate region estimation is expected to be applied to a product search service or O2O (online to online) service using captured images.

A typical example of object candidate region estimation will be described generally in accordance with NPL 1. First, a boundary line, which is a location that changes acutely in an image, is detected. Next, a score indicating the degree to which the region exactly includes the object is calculated for each region cut out using a sliding window or the like. Finally, a high-ranking region with a high score is output as the object candidate region.

This kind of object candidate region estimation is premised on many boundary lines being detected in a foreground region, which is a region of a target object, and the boundary lines not being detected as much in a background region, which a region that is not a target object. For example, if many boundary lines are detected in the background region, a candidate region will be estimated in the background or the like, and thus a candidate region obtained by accurately detecting the target object cannot be estimated. In other words, the candidate region of the target object can be estimated with high precision as long as the boundary lines of the target object can be detected exactly.

Various techniques have been invented and developed as methods for detecting boundary regions. For example, NPL 2 discloses a method called the Canny method.

In the Canny method, a two-dimensional Gaussian function obtained by finding a first derivative is superimposed in the x direction and the y direction of an image, the derivative values in the x direction and the y direction are obtained, and the magnitude of the gradient and the gradient direction are obtained based on the derivative values of the pixels. Next, in order to suppress pixels that are not boundary lines, it is determined whether or not each pixel is a maximum value in the gradient direction, and pixels that are not maximum values are suppressed. Finally, using two types of threshold values (a threshold value 1 and a threshold value 2), pixels in which the magnitude of the gradient is greater than the threshold value 1, and pixels in which the magnitude of the gradient is greater than the threshold value 2 and which are detected as boundary lines are detected as boundary lines.

In general, a boundary line detected using this kind of boundary line detection is significantly influenced by parameters such as the standard deviation of the superimposed Gaussian function and the two types of threshold values used in the threshold value processing.

For example, if the standard deviation is increased, only boundary lines indicating general features of the image will be detected, and if the threshold values are increased, the number of boundary lines that are detected tends to decrease. For this reason, it is necessary to appropriately set the parameters in order to perform boundary line detection with little non-detection and erroneous detection.

However, since the appropriate values of the parameters differ according to the image, it is difficult to set common parameters that can detect boundary lines in any image with high precision.

In order to solve this kind of problem, initiatives have been undertaken relating to a technique for detecting boundary lines with high precision regardless of parameters.

For example, NPL 3 describes a threshold value determination method for the Canny method based on Otsu's binarization method. A value t that divides pixel values of an image into two classes is determined using Otsu's binarization method. That is, the value t is the value at which the ratio of inter-class variance with respect to intra-class variance when divided into two classes is at its maximum. By setting the value t to the threshold value 1 and 0.5×t to the threshold value 2, parameters can be set for each image.

Also, PTL 1 discloses a method for boundary line detection using a machine learning approach. Data to which boundary line information had been added artificially can be learned as a training image, and a boundary line with the learned shape can be detected with high precision.

CITATION LIST

Patent Literature

[PTL 1] Japanese Patent Application Laid-open No. 2015-103075

Non Patent Literature

[NPL 1] C. L. Zitnick and P. Doll'ar. Edge boxes: Locating object proposals from edges. In ECCV, 2014.
[NPL 2] John Canny, "A Computational Approach to Edge Detection", IEEE Trans. on PAML, Vol. 8, No. 6, Nov. 1986, pp. 679-698.
[NPL 3] M. Fang, G. X. Yue and Q. C. Yu, "The Study on An Application of Otsu Method in Canny Operator", in Proc. ISIP'09, 2009, August 2009, pp. 109-112.

SUMMARY OF THE INVENTION

Technical Problem

However, the method according to NPL 3 has been problematic in that it is not necessarily the case that the threshold value is determined based on the entire image and the boundary lines of the target object are detected exactly.

Also, only the threshold value 1 is adaptively determined based on the image, and not all of the parameters are adaptively determined. For this reason, for example, there has been a problem in that a boundary line in which the magnitude of the gradient falls below 0.5×t (threshold value 2) cannot be detected.

Furthermore, there has been a problem in that a suitable value needs to be separately set for the standard deviation of the gaussian function as well.

Also, the method according to PTL 1 has also been problematic in that the cost of providing boundary line information to an image and a calculation cost for learning are needed since it is necessary to prepare a training image in advance.

Also, the boundary lines can be detected with high precision as long as a suitable value for the above-described parameter can be manually set for each image. However, there has been a problem in that it is inefficient to adjust the value of each parameter for each image.

The present invention has been made in view of the foregoing problems and aims to provide a candidate region estimation apparatus, a candidate region estimation method, and a program, according to which it is possible to estimate a candidate region indicating each of multiple target objects included in an image with high precision.

Means for Solving the Problem

The candidate region estimation apparatus according to the present invention is a candidate region estimation apparatus configured to, for each of a plurality of target objects, estimate a candidate region that is a candidate for a region including the target object, in an image including the plurality of target objects, the candidate region estimation apparatus being constituted by including: an input unit configured to receive input of the image and region information indicating a region including at least one of the plurality of target objects included in the image; a parameter determination unit configured to determine a parameter to be used when detecting boundary lines in the image, based on a ratio between a density of boundary lines included in the image and a density of boundary lines in a region indicated by the region information; a boundary line detection unit configured to detect a boundary line in the image using the parameter; and a region estimation unit configured to, for each of the plurality of target objects included in the image, estimate the candidate region of the target object based on the boundary lines detected by the boundary line detection unit.

Also, the candidate region estimation method according to the present invention is a candidate region estimation method for estimating, for each of a plurality of target objects, a candidate region that is a candidate for a region including the target object, in an image including the plurality of target objects, the candidate region estimation method including: an input step of receiving input of the image and region information indicating a region including at least one of the plurality of target objects included in the image; a parameter determination step of determining a parameter to be used when detecting a boundary line of the image, based on a ratio between a density of boundary lines included in the image and a density of boundary lines in a region indicated by the region information; a boundary line detection step of detecting boundary lines in the image using the parameter; and a region estimation step of, for each of the plurality of target objects included in the image, estimating the candidate region of the target object based on the boundary lines detected in the boundary line detection step.

According to the candidate region estimation apparatus and the candidate region estimation method of the present invention, the input unit receives input of an image and region information indicating a region including at least one of multiple target objects included in the image, and the parameter determination unit determines parameters that are to be used when detecting boundary lines in the image, based on the ratio between the density of the boundary lines included in the image and the density of the boundary lines in the region indicated by the region information.

Then, the boundary line detection unit detects the boundary lines in the image using the parameters, and the region estimation unit estimates the candidate region of the target object for each of the multiple target objects included in the image based on the detected boundary lines.

In this manner, the parameters to be used when detecting the boundary lines in the image are determined based on the ratio between the density of the boundary lines included in the image and the density of the boundary lines in the region indicated by the region information indicating the region including at least one of the multiple targets included in the image, the boundary lines are detected in the image using the parameters, and the candidate region of the target object is estimated for each of the target objects included in the image based on the detected boundary lines, whereby the candidate regions indicating each of the multiple target objects included in the image can be estimated with high precision.

Also, the parameter determination unit of the candidate region estimation apparatus according to the present invention can determine the parameter based on a ratio between the density of boundary lines included in the image and the density of boundary lines in a small region that is part of the region indicated by the region information.

Also, the region estimation unit of the candidate region estimation apparatus according to the present invention can estimate the candidate region of the target object from a region above or a region below the region indicated by the region information.

Also, the region estimation unit of the candidate region estimation apparatus according to the present invention can estimate the candidate region of the target object from a region to the right or a region to the left of the region indicated by the region information.

Also, the region estimation unit of the candidate region estimation apparatus according to the present invention can furthermore select the candidate region output as an estimation result from the estimated candidate regions of the target objects, based on the density of the boundary lines in the region indicated by the candidate region of the target object, and the density of the boundary lines in the region indicated by the region information.

The program according to the present invention is a program for causing functioning as the units of the above-described candidate region estimation apparatus.

Effects of the Invention

According to the candidate region estimation apparatus, the candidate region estimation method, and the program of the present invention, it is possible to estimate candidate regions indicating each of multiple target objects included in an image with high precision.

DESCRIPTION OF EMBODIMENTS

Hereinafter, an embodiment of the present invention will be described with reference to the drawings.

<Configuration of Candidate Region Estimation Apparatus According to Embodiment of the Present Invention>

Figure 1:
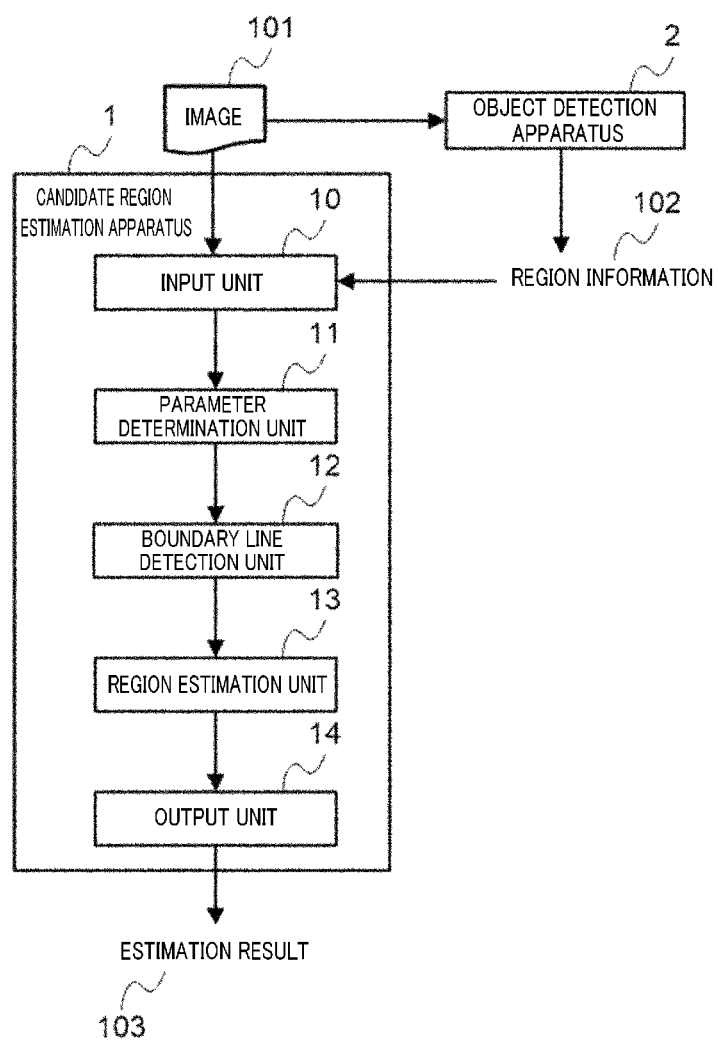
FIG. 1 is a block diagram showing a configuration of a candidate region estimation apparatus according to an embodiment of the present invention.

A configuration of a candidate region estimation apparatus 1 according to an embodiment of the present invention will be described with reference to FIG. 1. FIG. 1 is a block diagram showing a configuration of a candidate region estimation apparatus according to an embodiment of the present invention.

The candidate region estimation apparatus 1 is constituted by a computer including a CPU, a RAM, and a ROM storing a program for executing a later-described candidate region estimation processing routine, and in terms of function, is constituted as indicated below.

As shown in FIG. 1, the candidate region estimation apparatus 1 according to the present embodiment is constituted by including an input unit 10, a parameter determination unit 11, a boundary line detection unit 12, a region estimation unit 13, and an output unit 14.

The input unit 10 receives input of an image 101 including multiple target objects, and region information 102 indicating a region including at least one of the multiple target objects included in the image.

The region information 102 is information indicating the position of at least one of the multiple target objects included in the image 101. For example, the region information 102 is coordinates of vertices of a rectangular shape surrounding a certain target object.

Figure 2:
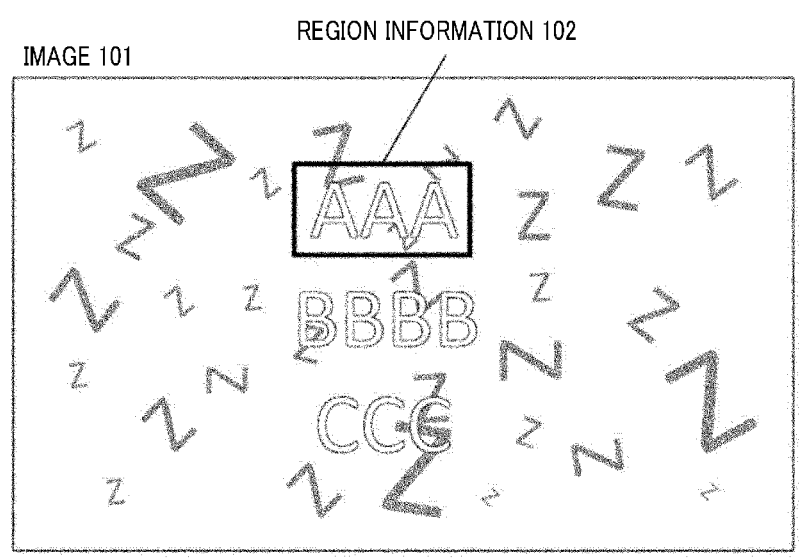
FIG. 2 is an image diagram showing an example of an image and region information that are targets of the embodiment of the present invention.

FIG. 2 shows an example of the image 101 and the region information 102. FIG. 2 is a diagram showing an image 101 including multiple target objects ("AAA", "BBB", and "CCC") and a background "Z", and region information 102 indicating the position of the target object "AAA".

Note that the object detection result for the image 101 can be used as the region information 102 input to the candidate region estimation apparatus 1, although this is not an essential constituent component in the embodiment of the present invention. In this case, an object detection apparatus 2 for detecting the position of at least one target image included in the image 101 is included externally.

For example, the method disclosed in Reference Document 1 may be used as the target object detection method.
[Reference Document 1] J. Redmon and A. Farhadi. YOLO9000: better, faster, stronger. In CVPR, 2017.

Also, the object detection apparatus 2 does not necessarily need to be included, and for example, the region information 102 may also be created by designating the position of at least one target object included in the image 101.

Then, the input unit 10 transfers the image 101 and the region information 102 to the parameter determination unit 11.

The parameter determination unit 11 determines the parameters to be used when detecting the boundary lines of the image 101 based on the ratio between the density of the boundary lines included in the image 101 and the density of the boundary lines in the region indicated by the region information 102.

Specifically, the parameter determination unit 11 first detects the boundary lines included in the image 101 and the boundary lines in the region indicated by the region information 102 by using any boundary line detection method and pre-determined parameters.

In the present embodiment, a case will be described in which the parameter determination unit 11 uses the Canny method disclosed in NPL 2 as the boundary line detection method. That is, the parameter determination unit 11 detects the boundary lines included in the image 101 and the boundary lines in the region indicated by the region information 102 using the Canny method and three types of predetermined parameters (the standard deviation of a superimposed gaussian function, and two types of threshold values to be used in threshold value processing). Note that the three types of parameters are parameters that are to be used when the parameter determination unit 11 detects the boundary lines.

Next, the parameter determination unit 11 obtains the density of the boundary lines included in the detected image 101 with respect to the entire image 101. The density of the boundary lines need only be obtained as the ratio of the number of pixels in which the boundary lines are present (amount of boundary lines) with respect to the pixel count (area) of the image.

Similarly, the parameter determination unit 11 obtains the density of boundary lines in the region of the boundary lines in the region indicated by the detected region information 102.

Next, the parameter determination unit 11 determines three types of parameters, namely the standard deviation of the superimposed gaussian function and the two types of threshold values to be used in the threshold value processing, based on the density of the boundary lines included in the image 101 and the density of the boundary lines in the region indicated by the region information 102. Note that the three types of parameters determined by the parameter determination unit 11 are parameters to be used when the boundary line detection unit 12 determines the boundary lines.

More specifically, for example, the parameter determination unit 11 determines the three types of parameters by performing a grid search on the possible ranges of the three types of parameters using the ratio of the density of the boundary lines in the region indicated by the region information 102 with respect to the density of the boundary lines included in the image 101 as an evaluation value.

By using this evaluation value, the parameter determination unit 11 can adaptively determine the parameters even if the ratio of the boundary lines detected based on a target object with respect to the boundary lines detected in the background in the region indicated by the region information is greater than the ratio of the boundary lines detected for the target object with respect to the boundary lines detected in the background in the overall image, in an image in which the magnitude of the gradient of the boundary lines of the target object is greater than the magnitude of the gradient of the boundary lines of the background.

For example, as shown in FIG. 2, if the background is present in the entire image 101 and the region indicated by the region information 102 exactly includes the target object, the density of the boundary lines of the background will be about the same inside and outside of the region, and thus it is expected that the density of the boundary lines of the target object will be greater in the region.

Also, as long as parameters according to which the evaluation value increases can be found, the parameter determination unit 11 does not necessarily need to perform a grid search, and for example, may use any parameter search method, such as random search or Bayes optimization.

The parameter determination unit 11 may also be configured to determine the parameters based on the ratio between the density of the boundary line included in the image 101 and the density of the boundary lines in a small region that is part of the region indicated by the region information 102.

In this case, for example, the parameter determination unit 11 uses the ratio of the density of the boundary lines of the partial small region in the region indicated by the region information 102 with respect to the density of the boundary lines included in the image 101 as an evaluation value.

For example, a region defined by the region information may be divided into an X×Y grid, the boundary line density of each of the X×Y small regions may be calculated, and the minimum value thereof may be used as the boundary line density of the partial small region. Here, X and Y need only be natural numbers, and for example, need only be 2 or the like.

By calculating the density of the boundary lines for each partial small region, the parameter determination unit 11 can robustly calculate the evaluation value for a case in which the magnitude of the gradient of the boundary lines of the target object varies.

Then, the parameter determination unit 11 transfers the image 101, the region information 102, and the determined parameters to the boundary line detection unit 12.

The boundary line detection unit 12 uses the parameters to detect the boundary lines in the image 101.

Specifically, the boundary line detection unit 12 uses any boundary line detection method and the parameters determined by the parameter determination unit 11 to detect the boundary lines of the image 101.

Here, although the boundary line detection method used by the boundary line detection unit 12 is not particularly limited, it is assumed that it is a method that is identical to the boundary line detection method used by the parameter determination unit 11.

Then, the boundary line detection unit 12 transfers the image 101, the region information 102, and the detected parameters to the region estimation unit 13.

For each of the multiple target objects included in the image 101, the region estimation unit 13 estimates a candidate region that is a potential region that includes the target object, based on the boundary lines detected by the boundary line detection unit 12.

Specifically, for each of the multiple target objects included in the image 101, the region estimation unit 13 uses any region estimation method to estimate the candidate region of the target object based on the image 101 and the boundary lines detected by the boundary line detection unit 12.

As for the region estimation method, any method can be used, as long as it is a region estimation method that uses boundary lines as input. For example, the candidate region of the target object can be estimated by using the method disclosed in NPL 1.

Also, the region estimation unit 13 may be configured to estimate the candidate region of the target object based on a region above or a region below the region indicated by the region information 102.

Specifically, this configuration can be used if the arrangement information of the multiple target objects included in the image 101 can be used. For example, as shown in FIG. 2, if an image 101 in which each target object is arranged side by side in a horizontal direction is used as a target, there is a possibility that another target object is present above or below the position of the region indicated by the region information 102, and therefore the region estimation unit 13 need only perform estimation of the candidate region using regions above and below the position of the region indicated by the region information 102.

Also, the region estimation unit 13 may be configured to estimate the candidate region of the target object based on a region to the right or a region to the left of the region indicated by the region information 102.

Similarly to the case of performing estimation of the candidate region using the upper and lower regions as targets, the region estimation unit 13 may perform estimation of the candidate region using regions to the left and right of the region indicated by the region information 102.

The region estimation unit 13 may also be configured to further select a candidate region output as an estimation result 103 based on the density of the boundary lines in the region indicated by the candidate region of the target object and the density of the boundary lines in the region indicated by the region information 102, from the estimated candidate regions of the target object.

In this case, for each of the estimated candidate regions, as the estimation result 103, the region estimation unit 13 outputs only the candidate region in which the density of the boundary lines is about the same (e.g., within NC, N being a real number between 0 and 100) as the density of boundary lines in the region indicated by the region information 102.

According to this kind of configuration, since only the candidate region in which the density of the boundary lines is about the same as the density of the boundary lines in the region indicated by the region information 102 is used as the estimation result 103, it is possible to suppress erroneous estimation of the region.

Then, the region estimation unit 13 transfers the estimation result 103 to the output unit 14. Note that the estimation result 103 includes the region information indicating the positions of each of the target objects included in the image 101.

The output unit 14 outputs the estimation result 103.

<Operation of Candidate Region Estimation Apparatus According to Embodiment of the Present Invention>

Figure 3:
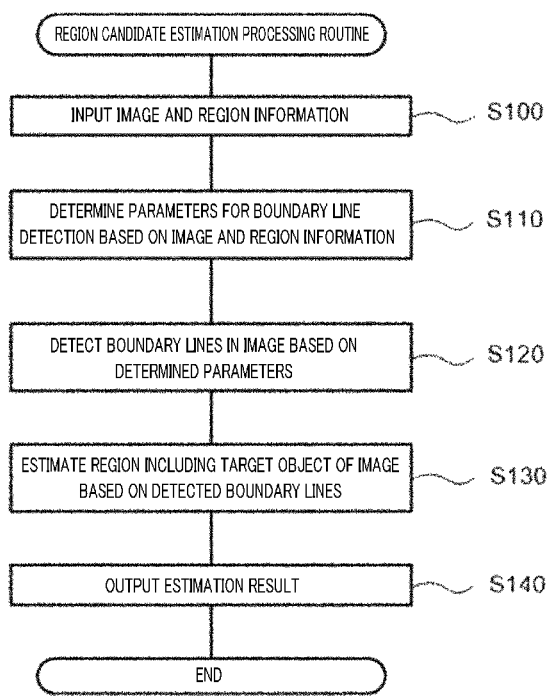
FIG. 3 is a flowchart showing a candidate region estimation processing routine of a candidate region estimation apparatus according to an embodiment of the present invention.

FIG. 3 is a flowchart showing a candidate region estimation processing routine according to an embodiment of the present invention.

When the input unit 10 receives input of the image 101 and the region information 102, the candidate region estimation apparatus 1 executes a candidate region estimation processing routine shown in FIG. 3.

First, in step S100, the input unit 10 receives input of the image 101 and the region information 102.

In step S110, the parameter determination unit 11 determines the parameters to be used when detecting the boundary lines of the image 101 based on the ratio between the density of the boundary lines included in the image 101 and the density of the boundary lines in the region indicated by the region information 102.

In step S120, the boundary line detection unit 12 detects the boundary lines in the image 101 using the parameters determined in step S110 above.

In step S130, for each of the multiple target objects included in the image 101, the region estimation unit 13 estimates the candidate region that is a candidate for a region including the target object based on the boundary lines detected in step S120 above.

In step S140, the output unit 14 outputs the estimation result 103, which is the result estimated in step S130 above.

As described above, according to the candidate region estimation apparatus of the embodiment of the present invention, the parameters for detecting the boundary lines of the image are determined based on the ratio between the density of boundary lines included in the image and the density of boundary lines in the region indicated by the region information indicating the region including at least one of the multiple target objects included in the image. Also, the parameters can be used to detect the boundary lines in the image, and for each of the multiple target objects included in the image, the candidate region indicating each of the target objects included in the image can be estimated with high precision by estimating the candidate region of the target object based on the detected boundary lines.

Note that the present invention is not limited to the above-described embodiment, and various modifications and applications are possible without departing from the spirit of the invention.

Also, in the specification of the present application, an embodiment in which a program is installed in advance was described, but the program can also be provided stored in a computer-readable storage medium.

REFERENCE SIGNS LIST

1 Candidate region estimation apparatus
2 Object detection apparatus
10 Input unit
11 Parameter determination unit
12 Boundary line detection unit
13 Region estimation unit
14 Output unit
101 Image
102 Region information
103 Estimation result

The invention claimed is:

1. A candidate region estimation apparatus configured to, for each of a plurality of target objects, estimate a candidate region that is a candidate for a region including said each target object, in an image including the plurality of target objects, the candidate region estimation apparatus comprising a processor configured to:
receive input of the image and region information indicating a region including at least one of the plurality of target objects included in the image;
detect boundary lines in the image using a Canny method and a plurality of types of predetermined parameters;
determine a parameter to be used when detecting boundary lines in the image, based on a ratio between a density of boundary lines included in the image and a density of boundary lines in a region indicated by the region information;
detect a boundary line in the image using the parameter; and
estimate for each of the plurality of target objects included in the image, the candidate region of said each target based on the boundary lines detected by the boundary line detector.

2. The candidate region estimation apparatus according to claim 1, wherein determining the parameter based on a ratio between the density of boundary lines included in the image and the density of boundary lines in a small region that is part of the region indicated by the region information.

3. The candidate region estimation apparatus according to claim 1, wherein estimating the candidate region of said each target object from a region above or a region below the region indicated by the region information.

4. The candidate region estimation apparatus according to claim 1, wherein estimating the candidate region of said each target object from a region to the right or a region to the left of the region indicated by the region information.

5. The candidate region estimation apparatus according to claim 1, wherein selecting a candidate region output as an estimation result from the estimated candidate regions of said each target objects, based on the density of the boundary lines in the region indicated by the candidate region of the target object, and the density of the boundary lines in the region indicated by the region information.

6. A candidate region estimation method for estimating, for each of a plurality of target objects, a candidate region that is a candidate for a region including said each target object, in an image including the plurality of target objects, the candidate region estimation method comprising:
receiving, input of the image and region information indicating a region including at least one of the plurality of target objects included in the image;
detecting boundary lines in the image using a Canny method and a plurality of types of predetermined parameters;
determining, a parameter to be used when detecting a boundary line of the image, based on a ratio between a density of boundary lines included in the image and a density of boundary lines in a region indicated by the region information;
detecting, boundary lines in the image using the parameter; and
for each of the plurality target objects included in the image, estimating the candidate region of said each target object based on the boundary lines detected in the boundary line detection step.

7. A system for estimating a candidate region, the system comprises:
a processor; and
a memory storing computer-executable program instructions that when executed by the processor cause the system to:
receive, input of the image and region information indicating a region including at least one of the plurality of target objects included in the image;
detect boundary lines in the image using a Canny method and a plurality of types of predetermined parameters;
determine, a parameter to be used when detecting a boundary line of the image, based on a ratio between a density of boundary lines included in the image and a density of boundary lines in a region indicated by the region information;
detect, boundary lines in the image using the parameter; and
for each of the plurality of target objects included in the image, estimate, by a region estimator, the candidate region of said each target object based on the boundary lines detected in the boundary line detection step.

8. The candidate region estimation method according to claim 6, wherein determining the parameter based on a ratio between the density of boundary lines included in the image and the density of boundary lines in a small region that is part of the region indicated by the region information.

9. The candidate region estimation method according to claim 6, wherein estimating the candidate region of said each target object from a region above or a region below the region indicated by the region information.

10. The candidate region estimation method according to claim 6, wherein estimating the candidate region of said each target object from a region to the right or a region to the left of the region indicated by the region information.

11. The candidate region estimation method according to claim 6, wherein selecting a candidate region output as an estimation result from the estimated candidate regions of said each target objects, based on the density of the boundary lines in the region indicated by the candidate region of the target object, and the density of the boundary lines in the region indicated by the region information.

12. The system for estimating the candidate region according to claim 7, wherein determining the parameter based on a ratio between the density of boundary lines included in the image and the density of boundary lines in a small region that is part of the region indicated by the region information.

13. The system for estimating the candidate region according to claim 7, wherein estimating the candidate region of said each target object from a region to the right or a region to the left of the region indicated by the region information.

14. The system for estimating the candidate region according to claim 7, wherein estimating the candidate region of said each target object from a region to the right or a region to the left of the region indicated by the region information.

15. The system for estimating the candidate region according to claim 7,
wherein selecting a candidate region output as an estimation result from the estimated candidate regions of said each target objects, based on the density of the boundary lines in the region indicated by the candidate region of the target object, and the density of the boundary lines in the region indicated by the region information.

16. The candidate region estimation apparatus according to claim 1, wherein the density of boundary lines included in the image includes a first ratio of a number of pixels occupied by the boundary lines of the image with respect to a number of pixels inside the image, and wherein the density of boundary lines in the region includes a second ratio of a number of pixels occupied by the boundary lines of the region with respect to a number of pixels inside the region.

17. The candidate region estimation method according to claim 6, wherein the density of boundary lines included in the image includes a first ratio of a number of pixels occupied by the boundary lines of the image with respect to a number of pixels inside the image, and wherein the density of boundary lines in the region includes a second ratio of a number of pixels occupied by the boundary lines of the region with respect to a number of pixels inside the region.

18. The system for estimating the candidate region according to claim 7, wherein the density of boundary lines included in the image includes a first ratio of a number of pixels occupied by the boundary lines of the image with respect to a number of pixels inside the image, and wherein the density of boundary lines in the region includes a second ratio of a number of pixels occupied by the boundary lines of the region with respect to a number of pixels inside the region.

19. The candidate region estimation apparatus according to claim 1, wherein the parameter to be used when detecting boundary lines in the image includes a combination of:
 a standard deviation of a Gaussian function for convolution associated with the Canny edge detection on the image and the region,
 a first threshold value based on the density of boundary lines included in the image, and
 a second threshold value based on the density of boundary lines in a region indicated by the region information.

20. The candidate region estimation method according to claim 6, wherein the parameter to be used when detecting boundary lines in the image includes a combination of:
 a standard deviation of a Gaussian function for convolution associated with the Canny edge detection on the image and the region,
 a first threshold value based on the density of boundary lines included in the image, and
 a second threshold value based on the density of boundary lines in a region indicated by the region information.

* * * * *